United States Patent
Song et al.

(10) Patent No.: US 10,316,954 B2
(45) Date of Patent: Jun. 11, 2019

(54) OIL CONTROL SYSTEM AND METHOD FOR DUAL CLUTCH TRANSMISSION

(71) Applicants: Hyundai Motor Company, Seoul (KR); Kia Motors Corporation, Seoul (KR)

(72) Inventors: Kyung Song, Yongin-si (KR); Ho Rim Yang, Yongin-si (KR); Young Min Yoon, Hwaseong-si (KR); Eui Hee Jeong, Hwaseong-si (KR); Woo Jung Kim, Suwon-si (KR); Yong Uk Shin, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 115 days.

(21) Appl. No.: 15/621,780

(22) Filed: Jun. 13, 2017

(65) Prior Publication Data

US 2018/0163844 A1    Jun. 14, 2018

(30) Foreign Application Priority Data

Dec. 12, 2016   (KR) ......................... 10-2016-0168771

(51) Int. Cl.
   *F16H 57/04*    (2010.01)
   *F16D 13/72*    (2006.01)
(52) U.S. Cl.
   CPC ....... *F16H 57/0412* (2013.01); *F16H 57/042* (2013.01); *F16H 57/0435* (2013.01); *F16H 57/0473* (2013.01)

(58) Field of Classification Search
   CPC .............................................. F16D 2500/3051
   See application file for complete search history.

(56) References Cited

U.S. PATENT DOCUMENTS

| | | | | |
|---|---|---|---|---|
| 6,715,597 | B1 * | 4/2004 | Buchanan | F16D 25/123 192/113.35 |
| 7,128,688 | B2 * | 10/2006 | Katou | F16D 25/10 477/98 |
| 8,645,036 | B2 | 2/2014 | Kiessner-Haiden | |
| 8,997,958 | B2 * | 4/2015 | Schuller | F16H 61/688 192/113.3 |
| 9,869,353 | B2 * | 1/2018 | Kuwahara | F16D 25/123 |

(Continued)

FOREIGN PATENT DOCUMENTS

| | | |
|---|---|---|
| JP | 2004-509297 A | 3/2004 |
| JP | 2008-014423 A | 1/2008 |

(Continued)

*Primary Examiner* — Mark A Manley
(74) *Attorney, Agent, or Firm* — Morgan, Lewis & Bockius LLP

(57) ABSTRACT

An oil circuit includes an oil pan in which oil is stored, an oil supply line extending from the oil pan, a cooling oil supply line branched from the oil supply line and connected to the dual clutch of the dual clutch transmission, a lubricating oil supply line branched from the oil supply line and connected to the gearbox of the dual clutch transmission, a distribution valve disposed in the oil supply line and configured to distribute the oil to the cooling oil supply line and the lubricating oil supply line, and an oil pump configured to pump the oil from the oil pan, and a control device configured to control an operation of the oil pump and to control an opening degree of the distribution valve.

9 Claims, 3 Drawing Sheets

(56) References Cited

U.S. PATENT DOCUMENTS

| | | | |
|---|---|---|---|
| 2004/0112171 A1* | 6/2004 | Kuhstrebe | B60K 6/547 74/730.1 |
| 2011/0314945 A1* | 12/2011 | Brandenburg | F16H 61/0031 74/473.11 |
| 2014/0018209 A1 | 1/2014 | Dodo et al. | |
| 2014/0195131 A1 | 7/2014 | Porto et al. | |
| 2015/0192179 A1 | 7/2015 | Armiroli | |

FOREIGN PATENT DOCUMENTS

| | | |
|---|---|---|
| JP | 2011-522191 A | 7/2011 |
| JP | 2012-515883 A | 7/2012 |
| JP | 2012-154426 A | 8/2012 |
| JP | 2013-047532 A | 3/2013 |
| JP | 2016-031118 A | 3/2016 |
| JP | 2016-044743 A | 4/2016 |
| KR | 10-2014-0035030 A | 3/2014 |
| KR | 10-2015-0033641 A | 4/2015 |

* cited by examiner

OIL CONTROL SYSTEM AND METHOD FOR DUAL CLUTCH TRANSMISSION

CROSS-REFERENCE(S) TO RELATED APPLICATIONS

The present application claims priority to Korean Patent Application No. 10-2016-0168771, filed on Dec. 12, 2016, the entire contents of which is incorporated herein for all purposes by this reference.

BACKGROUND OF THE INVENTION

Field of the Invention

The present invention relates to an oil control system and an oil control method for a dual clutch transmission, and more particularly to an oil control system and an oil control method for a dual clutch transmission by which a cooling performance of a dual clutch of the dual clutch transmission may be optimized.

Description of Related Art

A dual clutch transmission is a kind of an automated manual transmission, and has two separated clutches and two separated input shafts. The two input shafts are connected to an odd number side gear set and an even number side gear set, respectively.

When the clutches of the dual clutch slip, the temperature of the clutch plates or a friction material may increase due to thermal energy, and the possibility of damaging the clutch plates or the frictional material is high due to the increase in temperature of the clutch plates or the frictional material. Further, as the transmission torques of the clutches may change depending on the temperature of the clutch plates or the frictional material, the shift qualities of the clutches may be influenced.

Meanwhile, the dual clutch is classified into a dry type and a wet type. The dry type dual clutch uses little oil and is cooled by the flow of air, which relatively deteriorates cooling efficiency and durability.

The wet type dual clutch uses oil, shows an excellent cooling performance, and has a high torque allowance. Accordingly, the wet type dual clutch has a cooling circuit that supplies cooling oil such as transmission fluid.

However, according to the conventional wet type dual clutch, the temperature of the clutch is been measured by a sensor, but it is difficult to precisely measure the temperature of the clutch due to a failure of the sensor in an extreme condition, so that the flow amount of supplied cooling fluid cannot be properly controlled.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an oil control system and an oil control method for a dual clutch transmission, by which the flow amount of cooling oil supplied to a dual clutch may be precisely and efficiently controlled by accurately predicting the temperature of the dual clutch by use of a temperature prediction model.

The technical problems to be solved by the present invention are not limited to the aforementioned problems, and any other technical problems not mentioned herein will be clearly understood from the following description by those skilled in the art to which the present invention pertains.

According to various aspects of the present invention, an oil control system for a dual clutch transmission, which is configured to control cooling oil supplied to a dual clutch of the dual clutch transmission and lubricating oil supplied to a gearbox of the dual clutch transmission, may include an oil circuit including an oil pan in which oil is stored, an oil supply line extending from the oil pan, a cooling oil supply line branched from the oil supply line and connected to the dual clutch of the dual clutch transmission, a lubricating oil supply line branched from the oil supply line and connected to the gearbox of the dual clutch transmission, a distribution valve disposed in the oil supply line and configured to distribute the oil to the cooling oil supply line and the lubricating oil supply line, and an oil pump configured to pump the oil from the oil pan, and a control device configured to control an operation of the oil pump and to control an opening degree of the distribution valve.

According to various aspects of the present invention, an oil control method for a dual clutch transmission, for controlling cooling oil supplied to a dual clutch of the dual clutch transmission and lubricating oil supplied to a gearbox of the dual clutch transmission may include determining a necessary flow amount of cooling oil based on temperatures of the clutches of the dual clutch and determining a necessary flow amount of lubricating oil based on a degree of lubrication of the gears, determining a total necessary flow amount of the cooling oil and the lubricating oil of the dual clutch transmission by adding the necessary flow amount of the lubricating oil and the necessary flow amount of the cooling oil, and determining an RPM of an oil pump based on the total necessary flow amount of the oil and determining a flow amount of the supplied cooling oil and a flow amount of the supplied lubricating oil.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
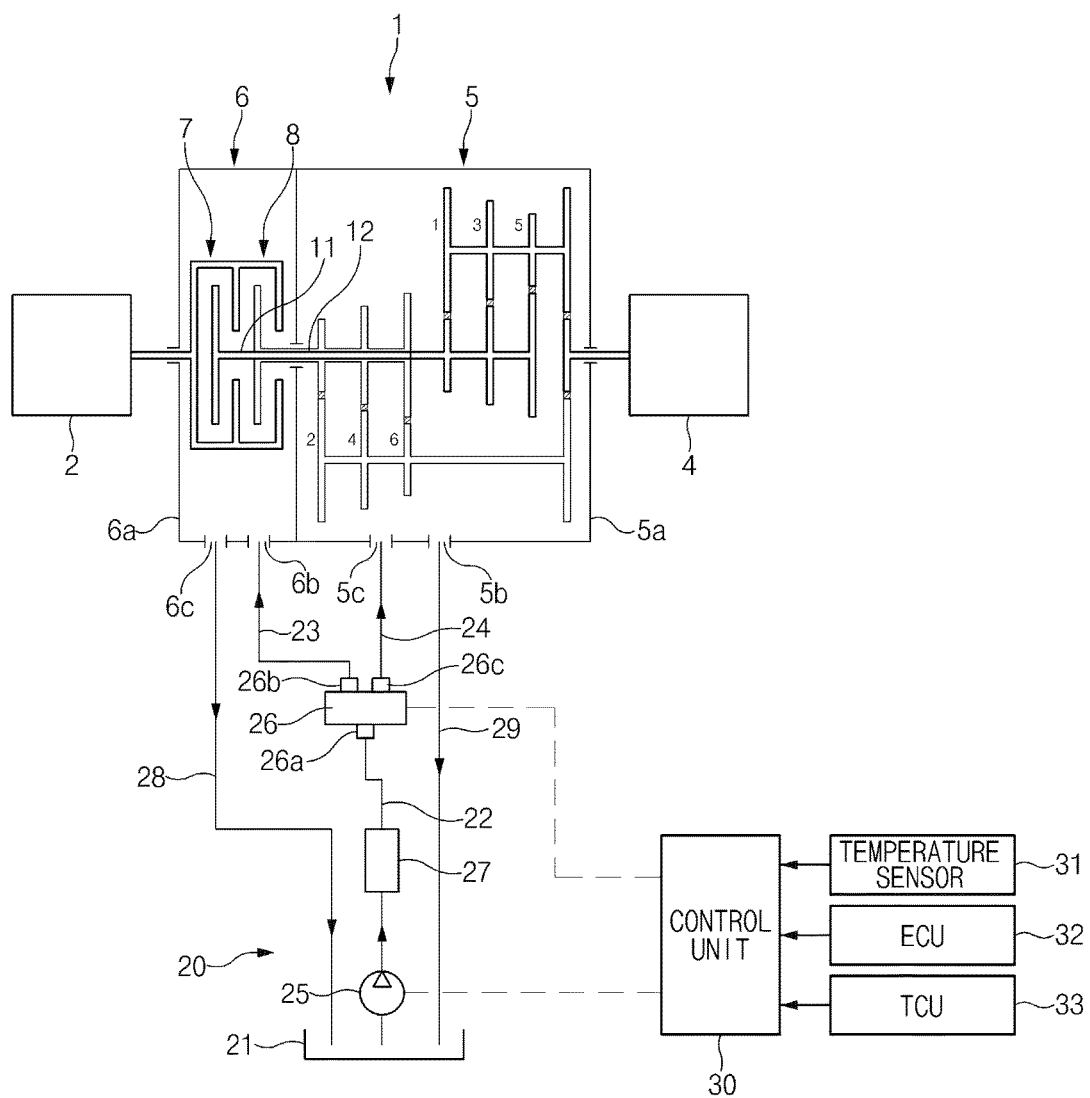
FIG. 1 is a schematic illustration of a dual clutch transmission controlled through an oil control system and an oil control method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

Referring to FIG. 1, a dual clutch transmission 1 may be disposed between an engine 2 and a differential apparatus 4 to transmit power of the engine 2 to the differential apparatus 4.

The dual clutch transmission 1 may include a gearbox 5, and a dual clutch 6 disposed between the engine 2 and the gearbox 5 to transmit a torque of the engine 2 to the gearbox 5.

The gearbox 5 may include gears that may be moved between a plurality of forward ratios and a plurality of reverse ratios.

The dual clutch 6 may have two clutches 7 and 8 that may drive the gears of the gearbox 5 through two concentric shafts 11 and 12, and the clutches 7 and 8 may have a plurality of clutch plates and frictional materials.

An oil circuit 20 of the dual clutch transmission according to the exemplary embodiment of the present invention may include an oil pan 21 in which oil is stored, an oil supply line 22 extending from the oil pan 21, a cooling oil supply line 23 branched from the oil supply line 22 and connected to the dual clutch 6, a lubricating oil supply line 24 branched from the oil supply line 22 and connected to the gearbox 5, and an oil pump 25 configured to pump oil from the oil pan 21.

The oil supply line 22 may extend from the oil pan 21 towards the dual clutch transmission 1. Oil for cooling and lubrication may be supplied to the dual clutch transmission 1 through the oil supply line 22.

A distribution valve 26 is disposed in the oil supply line 22, and the distribution valve 26 distributes oil to the cooling oil supply line 23 and the lubricating oil supply line 24.

The distribution value 26 may have an entrance 26a to which the oil supply line 22 is connected, a first exit 26b connected to the cooling oil supply line 23, and a second exit 26c to which the lubricating oil supply line 24 is connected. A portion of the oil supplied through the oil supply line 22 may be discharged through the first exit 26b and be supplied to the dual clutch 6 as cooling oil, and the remaining portion of the oil may be discharged through the second exit 26c and be supplied to the gearbox 5 as lubricating oil.

The distribution valve 26 may include an electronic control valve having a solenoid, and the distribution valve 26 may properly distribute a flow amount of the cooling oil supplied to the cooling oil supply line 23 and a flow amount of the lubricating oil supplied to the lubricating oil supply line 24 by relatively adjusting an opening degree of the first exit 26b and an opening degree of the second exit 26c by a control device 30.

The duty of solenoid of the distribution valve 26 is controlled by the control device so that the opening degree of the first exit 26b and the opening degree of the second exit 26c may be relatively adjusted. For example, when the opening degree of the first exit 26b is 0%, the opening degree of the second exit 26c may be 100%, and accordingly, the whole oil (100%) pumped by the oil pump 25 is supplied to the gearbox 5 as lubricating oil but oil is not supplied to the dual clutch 6 at all. Further, when the opening degree of the first exit 26b is 30%, the opening degree of the second exit 26c may be 70%, and accordingly, the oil of 30% of the oil pumped by the oil pump 25 may be supplied to the dual clutch 6 as cooling oil and 70% of the oil may be supplied to the gearbox 5 as lubricating oil.

For example, the control device 30 may determine the necessary flow amount of the cooling oil and the necessary flow amount of the lubricating oil to determine a total necessary flow amount of the oil, and may control the opening degree of the first exit 26b and the opening degree of the second exit 26c of the distribution valve 26 based on the total necessary flow amount of the oil.

The cooling oil supply line 23 may be connected to the first exit 26b of the distribution valve 26 and the dual clutch 6, the cooling oil, of which the flow amount has been adjusted through the opening degree of the first exit 26b of the distribution valve 26, may be supplied to the dual clutch 6 through the cooling oil supply line 23, and accordingly, the dual clutch 6 may be properly cooled.

The lubricating oil supply line 24 may be connected to the second exit 26c of the distribution valve 26 and the gearbox 5, the lubricating oil, of which the flow amount has been adjusted through the opening degree of the second exit 26c of the distribution valve 26, may be supplied to the gearbox 5 through the lubricating oil supply line 24, and accordingly, the gears in the gearbox 5 may be properly lubricated.

The oil pump 25 may be an electric oil pump, and accordingly, the RPM of the oil pump 25 may be controlled by the control device 30 so that a total flow amount of the oil pumped by the oil pump 25 may be determined.

An oil cooler 27 may be disposed between the oil pump 25 and the distribution valve 26, and a cooling water line extending from a cooling water circuit of an engine may pass through the internal of the oil cooler 27. Accordingly, the oil passing through the oil cooler 27 may be cooled by engine cooling water passing through the cooling water line.

A housing 6a of the dual clutch 6 may have an oil entrance 6b to which the cooling oil supply line 23 is connected and an oil exit 6c to which a cooling oil recovery line 28 is connected. Accordingly, the cooling oil may be supplied into the dual clutch 6 through the cooling oil supply line 23, and the cooling oil may be recovered to the oil pan 21 through the cooling oil recovery line 28.

A housing 5a of the gearbox 5 may have an oil entrance 5c to which the lubricating oil supply line 24 is connected and an oil exit 5b to which the lubricating oil recovery line 29 is connected. Accordingly, the lubricating oil may be supplied into the gearbox 5 through the lubricating oil supply line 24, and the lubricating oil may be recovered to the oil pan 21 through the lubricating oil recovery line 29.

The control device 30 is connected to the oil pump 25 and the distribution valve 26 wherein operations of the oil pump 25 and the distribution valve 26 may be controlled by the control device 30.

A temperature sensor 31 configured to measure a temperature of oil, an engine control unit (ECU) 32, and a transmission control unit (TCU) 33 may be connected to the control device 30. According to an embodiment, the control device 30 may be integrally integrated with the TCU 30.

Figure 2:
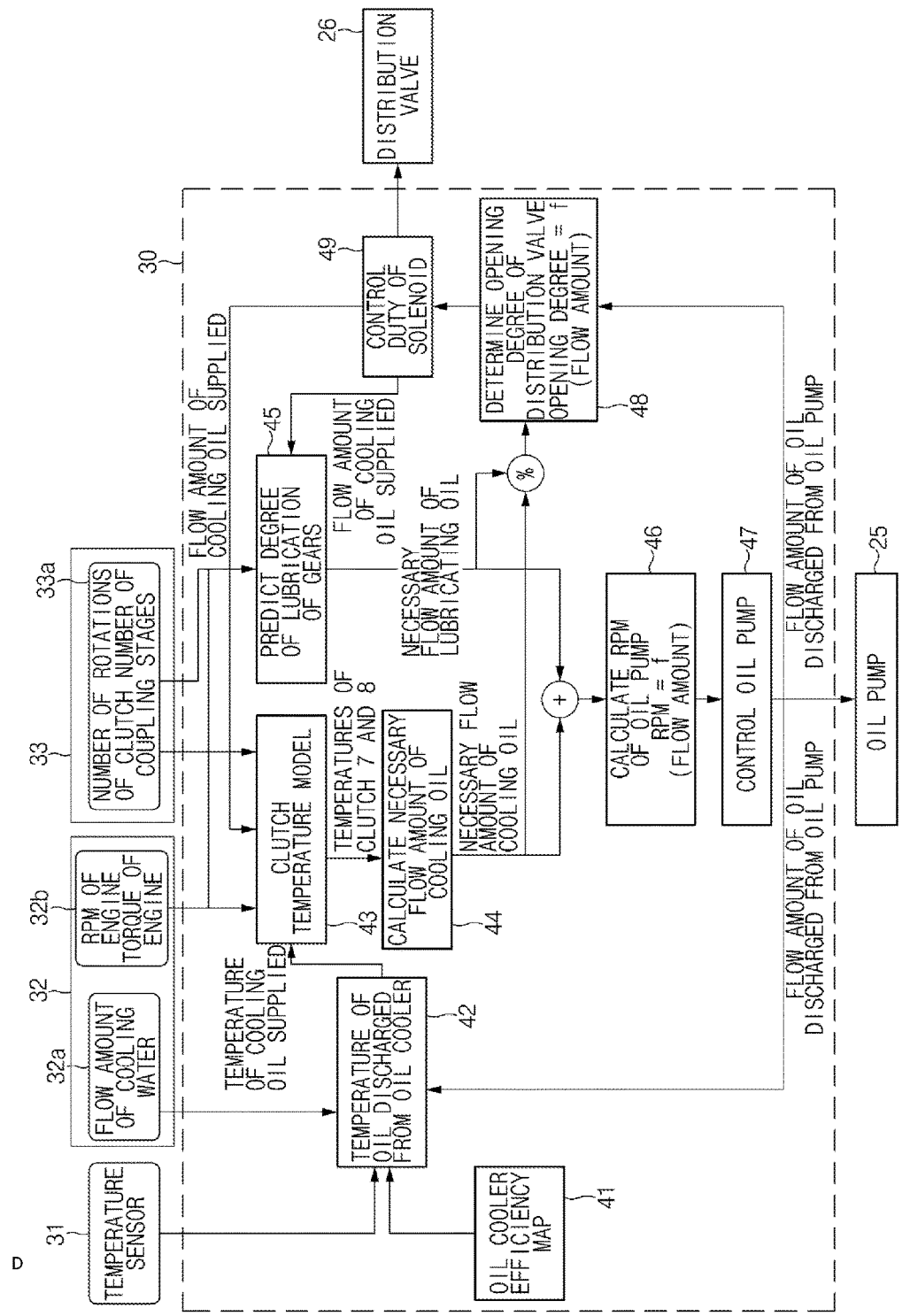
FIG. 2 is a block diagram illustrating an oil control system for a dual clutch transmission according to an exemplary embodiment of the present invention.

Referring to FIG. 2, the control device 30 determines a temperature of oil discharged from the oil cooler 27 by use of the temperature of oil measured by the temperature sensor 31, an oil cooler efficiency map 41, a flow rate of cooling water received from the ECU 32, and cooling water data 32a including a temperature of cooling water (42). Here, a temperature of the oil discharged from the oil cooler 27 may be a temperature of the cooling oil supplied to the oil entrance 6b of the housing 6a of the dual clutch 6. The oil cooler efficiency map 41 may be stored in a memory of the control device 30.

In the present way, temperatures of the clutches 7 and 8 of the dual clutch 6 may be predicted by applying a temperature of the cooling oil supplied to the oil entrance 6b of the dual clutch 6 to a temperature model 43.

According to an example, the temperature sensor 31 may be disposed adjacent to a discharge hole of the oil cooler 27, and accordingly, may measure the temperature (i.e., the temperature of the cooling oil) of the oil discharged from the oil cooler 27.

The clutch temperature model 43 may accurately determine (predict) temperatures of the clutches 7 and 8 of the dual clutch 6 by use of engine data 32b including an RPM and a torque of the engine, which are received from the ECU 32, clutch data 33a including the number of rotations of the clutches, which are received from the TCU 33, and coupling stages of the clutches, and a temperature equation including Equation 1.

$$(mC_p)_i \frac{dT_i}{dt} = \dot{Q}_{gen} + \sum \dot{Q}_{convection} + \sum \dot{Q}_{Heat\,flux}$$
$$= \dot{Q}_{gen} + \sum hA(T_{neighbor} - T_i) + \sum mC_p(T_{in} - T_i)$$

[Equation 1]

Here, $\dot{Q}_{gen}$ denotes an amount of generated heat, $\dot{Q}_{convection}$ denotes a convection heat, $\dot{Q}_{Heatflux}$ denotes heat flux, $C_p$ denotes the specific heat of oil, h denotes a heat transfer coefficient of oil, A denotes a cross-sectional area of an area through which oil is fed, m denotes a mass of oil, $T_i$ denotes a temperature of an area that is to be measured, and $T_{in}$ is a temperature of supplied oil.

The control device 30 determines a necessary flow amount of cooling oil by use of the temperatures of the clutches 7 and 8 of the dual clutch 6, which was determined by the clutch temperature model 43 (44).

The control device 30 applies the clutch data 33a including the numbers of rotations of the clutches, which are received from the TCU 33, and the coupling stages of the clutches, to a map or an equation, to predict a degree of lubrication of the gears of the gearbox 5, and a necessary flow amount of the lubricating oil is determined based on the predicted degree of lubrication of the gears (45).

The control device 30 may determine a total necessary flow amount of the oil by adding the necessary flow amount of the cooling oil and the necessary flow amount of the lubricating oil, may determine an RPM of the oil pump 25 based on the total necessary flow amount of the oil, and may determine the total flow amount of the supplied oil by applying the RPM of the oil pump 25 to a specific equation (46).

The control device 30 controls an operation of the oil pump 25 based on the total flow amount of the supplied oil (47). The flow amount of the oil discharged from the oil pump 25 is determined based on an operation of the oil pump 25, and the flow amount of the oil discharged from the oil pump 25 may be fed back to determine the temperature of the oil discharged from the oil cooler 27 (42) and control the opening degree of the distribution valve (48).

Further, the control device 30 may determine the opening degree of the first exit 26b and the opening degree of the second exit 26c of the distribution valve 26 by use of the necessary flow amount of the cooling oil and the necessary flow amount of the lubricating oil as a relative ratio, and may determine the flow amount of supplied cooling oil and the flow amount of supplied lubricating oil by applying the opening degree of the first exit 26b and the opening degree of the second exit 26c to a specific equation (48).

The duty of the solenoid of the distribution valve 26 is controlled based on the opening degree of the first exit 26b and the opening degree of the second exit 26c of the distribution valve 26 (49). The duty control data of the solenoid may be fed back to the clutch temperature model (43) and the prediction of the degree of lubrication of the gears (45).

Figure 3:
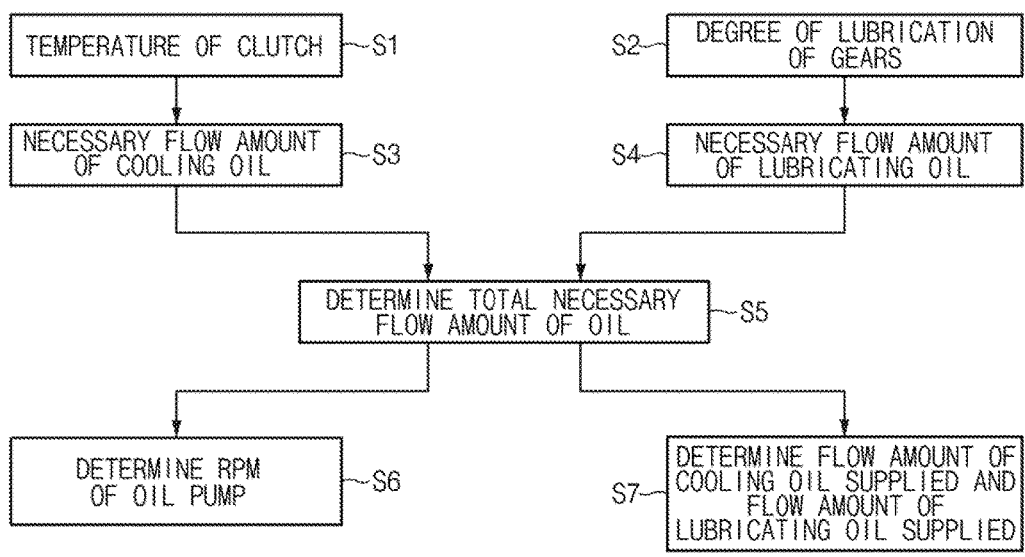
FIG. 3 is a flowchart illustrating an oil control method for a dual clutch transmission according to an exemplary embodiment of the present invention.

Referring to FIG. 3, an oil control method for a dual clutch transmission according to an exemplary embodiment of the present invention includes determining the temperatures of clutches 7 and 8 of the dual clutch 6 (S1) and determining a degree of lubrication of gears of a gearbox 5 (S2), determining a necessary flow amount of cooling oil based on temperatures of the clutches 7 and 8 of the dual clutch 6 (S3) and determining a necessary flow amount of lubricating oil based on the degree of lubrication of the gears (S4), adding the necessary flow amount of the lubricating oil and the necessary flow amount of the cooling oil to determine a total necessary flow amount of the cooling oil and the lubricating oil of the dual clutch transmission 1 (S5), and determining an RPM of an oil pump 25 based on the total necessary flow amount of the oil (S6) and determining a flow amount of the supplied cooling oil and a flow amount of the supplied lubricating oil (S7).

As described above, the control device 30 determines a temperature of oil discharged from the oil cooler 27 by use of a temperature of oil measured by the temperature sensor 31, an oil cooler efficiency map 41, a flow amount of cooling water received from the ECU 32, and cooling water data 32a including the temperature of cooling water. Here, the temperature of the oil discharged from the oil cooler 27 may be a temperature of the cooling oil supplied to the oil entrance 6b of the housing 6a of the dual clutch 6.

In the present way, the temperatures of the clutches 7 and 8 of the dual clutch 6 may be determined by applying a temperature of the cooling oil supplied to the oil entrance 6b of the dual clutch 6 to a temperature model 43 (S1). Here, the clutch temperature model 43 may determine the temperatures of the clutches 7 and 8 by use of a temperature of the supplied cooling oil, engine data 32b including an RPM and a torque of an engine which are received from an ECU 32, and clutch data 33a including the numbers of rotations of the clutches and the coupling stages of the clutches which are received from a TCU 33.

The control device 30 applies the clutch data 33a including the numbers of rotations of the clutches which are received from the TCU 33, and the coupling stages of the clutches, to a map or an equation to determine a degree of lubrication of the gears of the gearbox 5 (S2).

A necessary flow amount of cooling oil is determined by use of the temperatures of the clutches 7 and 8 of the dual clutch 6, which was determined by the clutch temperature model 43 (S3). In addition, a necessary flow amount of the lubricating oil is determined based on the determined degree of lubrication of the gears (S4).

A total necessary flow amount of the necessary oil is determined by adding the necessary flow amount of the cooling oil and the necessary flow amount of the lubricating oil (S5).

A RPM of the oil pump 25 is determined based on the total necessary flow amount of the oil (S6). A total flow amount of the supplied oil may be determined by applying an RPM of the oil pump 25 to a specific equation, an operation of the oil pump 25 may be controlled based on the total flow amount of the supplied oil, a flow amount of the oil discharged from the oil pump 25 may be determined based on an operation of the oil pump 25, and the flow amount of the oil discharged from the oil pump 25 may be fed back to the determination of the temperature of the oil discharged from the oil cooler 27 (42) and the control of the opening degree of the distribution valve (48).

In addition, the opening degree of the first exit 26b and the opening degree of the second exit 26c of the distribution valve 26 may be determined as a relative ratio by use of the necessary flow amount of the cooling oil and the necessary flow amount of the lubricating oil, and accordingly, the flow amount of the supplied cooling oil and the flow amount of the supplied lubricating oil are determined (S7).

According to an exemplary embodiment of the present invention, the flow amount of the cooling oil supplied to the clutches may be precisely and efficiently controlled by accurately predicting the temperatures of the clutches by use of the temperature prediction model, and accordingly, the cooling performance of the clutch may be improved.

In addition, oil and electrical energy may be efficiently used by properly distributing the cooling oil of the clutches and the lubricating oil of the gearbox.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing description of specific exemplary embodiments of the present invention has been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil control system for a dual clutch transmission, which is configured to control cooling oil supplied to a dual clutch of the dual clutch transmission and lubricating oil supplied to a gearbox of the dual clutch transmission, the oil control system comprising:
    an oil circuit including an oil pan in which oil is stored, an oil supply line extending from the oil pan, a cooling oil supply line branched from the oil supply line and connected to the dual clutch of the dual clutch transmission, a lubricating oil supply line branched from the oil supply line and connected to the gearbox of the dual clutch transmission, a distribution valve disposed in the oil supply line and configured to distribute the oil to the cooling oil supply line and the lubricating oil supply line, and an oil pump configured to pump the oil from the oil pan; and
    a control device configured to control an operation of the oil pump and to control an opening degree of the distribution valve,
    wherein the distribution valve has a single entrance to which the oil supply line is connected, a first exit to which the cooling oil supply line is connected, and a second exit to which the lubricating oil supply line is connected, and
    wherein an opening degree of the first exit and an opening degree of the second exit of the distribution valve are regulated relative to each other by the control device.

2. The oil control system of claim 1, wherein a temperature sensor configured to measure a temperature of the oil, an engine control unit (ECU), and a transmission control unit (TCU) are connected to the control device.

3. The oil control system of claim 2, wherein the control device is configured to determine temperatures of clutches of the dual clutch by applying a temperature of the cooling oil supplied, to a clutch temperature model, and is configured to determine a flow amount of the cooling oil by use of the temperatures of the clutches of the dual clutch determined through the clutch temperature model.

4. The oil control system of claim 3, wherein the control device is configured to determine a degree of lubrication of gears of the gearbox by use of clutch data received from the TCU, and is configured to determine a flow amount of the lubricating oil based on a predicted degree of lubrication of the gears.

5. The oil control system of claim 4, wherein the control device is configured to determine a total flow amount of the oil by adding the flow amount of the cooling oil and the flow amount of the lubricating oil, and is configured to determine an RPM of the oil pump based on the total flow amount of the oil.

6. The oil control system of claim 5, wherein the control device is configured to determine a relative ratio of the opening degree of the first exit and the opening degree of the second exit of the distribution valve by use of the flow amount of the cooling oil and the flow amount of the lubricating oil.

7. An oil control method for a dual clutch transmission, for controlling cooling oil supplied to a dual clutch of the dual clutch transmission and lubricating oil supplied to a gearbox of the dual clutch transmission, the oil control method including:
    determining a flow amount of the cooling oil based on temperatures of clutches of the dual clutch and determining a flow amount of lubricating oil based on a predicted degree of lubrication of the gears;
    determining a total flow amount of the cooling oil and the lubricating oil of the dual clutch transmission by adding the flow amount of the lubricating oil and the flow amount of the cooling oil; and
    determining an RPM of an oil pump based on the total flow amount of the oil and determining a flow amount of the supplied cooling oil and a flow amount of the supplied lubricating oil,
    wherein the cooling oil and the lubricating oil are distributed through a distribution valve and are supplied to the dual clutch and the gearbox, wherein the distribution valve has a single entrance to which an oil supply line is connected, a first exit through which the cooling oil is discharged, and a second exit through which the lubricating oil is discharged, and wherein an opening degree of the first exit and an opening degree of the second exit of the distribution valve are regulated relative to each other by the control device.

8. The oil control method of claim 7, wherein the total flow amount of the oil supplied is configured to be determined by the RPM of the oil pump, and an operation of the oil pump is configured to be controlled based on the total flow amount of the oil supplied.

9. The oil control method of claim 8, wherein a relative ratio of the opening degree of the first exit and the opening degree of the second exit of the distribution valve is configured to be determined by use of the flow amount of the cooling oil and the flow amount of the lubricating oil, and a flow amount of the cooling oil supplied to the dual clutch and a flow amount of the lubricating oil supplied to the gearbox are configured to be determined by the opening degree of the first exit and the opening degree of the second exit.

\* \* \* \* \*